UNITED STATES PATENT OFFICE 2,557,172

CETYLDIMETHYLBENZYL AMMONIUM 2-(5-CHLOROBENZOTHIAZYL)-SULFIDE

Lester A. Brooks, East Norwalk, Conn., assignor to R. T. Vanderbilt Company, Inc., New York, N. Y., a corporation of New York No Drawing. Original application February 5, 1947, Serial No. 726,742. Divided and this application February 7, 1947, Serial No. 727,273

1 Claim. (Cl. 260—306.6)

I have invented a new chemical compound not hitherto known which exhibits unusual properties in several applications. The new compound which I have invented is cetyldimethylbenzyl ammonium 2-(5-chlorobenzothiazyl)-sulfide, a compound of the formula

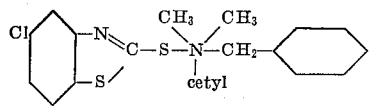

For example, cetyldimethylbenzyl ammonium 2-(5-chlorobenzothiazyl) sulfide may be prepared as follows: a solution of 4 grams (0.01 mole) of cetyldimethyl benzyl ammonium chloride dissolved in 25 cubic centimeters of water is added to a 25 cubic centimeter solution of the sodium salt of 5-chloro, 2-mercapto, benzothiazole prepared from 2 grams (.01 mole) of 5-chloro, 2-mercapto, benzothiazole. A quantitative yield of a white precipitate is formed which is filtered off and dried. Again for example, a quaternary ammonium halide derived from hydrogenated tallow comprising about 25% of

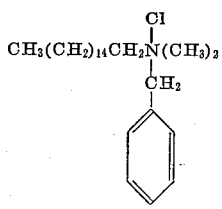

and about 75% of

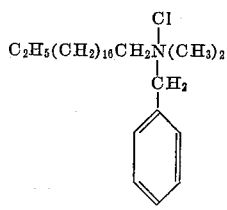

may be substituted for cetyl dimethyl benzyl ammonium chloride in the foregoing example.

The new compound of my invention is an effective fungicide in very low concentrations. Specifically, this compound has exhibited its characteristic fungicidal activity against *Aspergillus niger, Gymnosporangium juniperi-virginianae, Chaetomium globosum, Metarrhizium glutinosum* and *Pencillium*. Of these organisms *Aspergillus niger* has in general proven most resistant and I have therefore chosen it to illustrate this special activity of the compound constituting my invention in the following table. In this table, opposite the name of the compound, I have indicated the minimum concentration effective in parts per million of an aqueous medium under M. L. D. (minimum lethal dose) the concentration required to prevent germination and under R (retarding dose) the minimum concentration required to limit germination to 5% as maximum of cultures of *Aspergillus niger* incubated at 30° C. for 72 hours in a nutrient solution comprising 40 grams of dextrose, 2 grams of asparagine, 0.5 gram of dihydrogen potassium orthophosphate, 0.25 gram of magnesium sulfate with 7 molecules of water crystallization and 0.0003 gram of thiamine chloride per five liters of water.

|  | Aspergillus niger ||
|  | M. L. D., parts per million | R |
| --- | --- | --- |
| Cetyldimethylbenzyl ammonium 2-(5-chlorobenzothiazyl) sulfide | 50 | 20 |

The compound of my invention is insoluble in water and is a solid which is markedly waxy. Moreover, the compound of my invention is soluble in acetone, methyl alcohol, ethyl alcohol, isopropyl alcohol, methyl ethyl ketone, methyl acetate, ethyl acetate, monoethyl ether of ethylene glycol and monomethyl ether of ethylene glycol and is insoluble in straight run gasoline (70–72° A. P. I.) and in benzene and is slightly soluble in diethyl ether. The compound of my invention is insoluble in carbon tetrachloride.

The new compound of my invention is of special value, for example, in application to textiles to render the textiles proof against mildew or other fungus attack. This compound is conveniently applied to textiles by dissolving it in acetone, diluting this solution with from 1 to 3 volumes of water per volume of acetone, dipping the textile in this acetone-water solution or suspension of the compound or spraying it upon the textile, and drying the textile. Effective amounts of the new compound in the range of from about 0.01% to about 0.5% by weight on the textile can be deposited upon the textile in this manner. Textiles exhibit a high retention for this new compound, perhaps because of its waxy nature. Due to its insolubility in water it resists removal by leaching or washing with water. Being insoluble in the ordinary dry cleaning solvents, it resists removal by dry cleaning operations. Because of the low concentration in which it is an effective fungicide, this material can be applied to light colored or white goods even though color of the treated textile is important.

This application is a division for my application Serial No. 726,742 for the same subject matter executed February 3, 1947, now abandoned.

I claim:

Cetyldimethylbenzyl ammonium 2-(5-chlorobenzothiazyl) sulfide.

LESTER A. BROOKS.

REFERENCES CITED

The following references are of record in the file of this patent:

UNITED STATES PATENTS

| Number | Name | Date |
|---|---|---|
| 2,014,421 | Baird | Sept. 17, 1935 |
| 2,024,606 | Sebrell | Dec. 17, 1935 |
| 2,104,068 | Baird | Jan. 4, 1938 |
| 2,123,844 | Cramer | July 12, 1938 |
| 2,123,845 | Cramer | July 12, 1938 |
| 2,419,294 | Skaptason | Apr. 22, 1947 |
| 2,437,170 | Minich | Mar. 2, 1948 |

FOREIGN PATENTS

| Number | Country | Date |
|---|---|---|
| 457,477 | Great Britain | 1936 |